Feb. 2, 1932.  H. J. NEUFANG  1,843,780
PLOW
Filed July 2, 1930  7 Sheets-Sheet 4
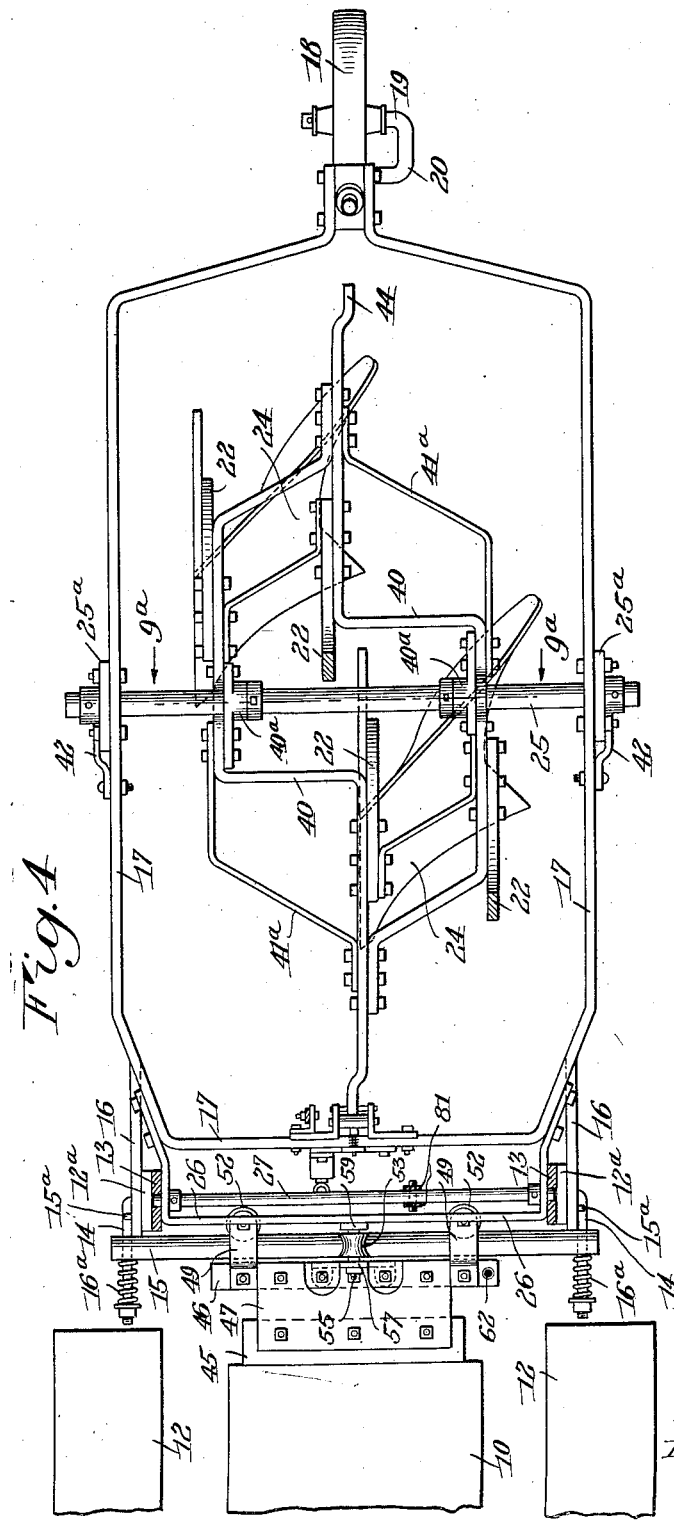
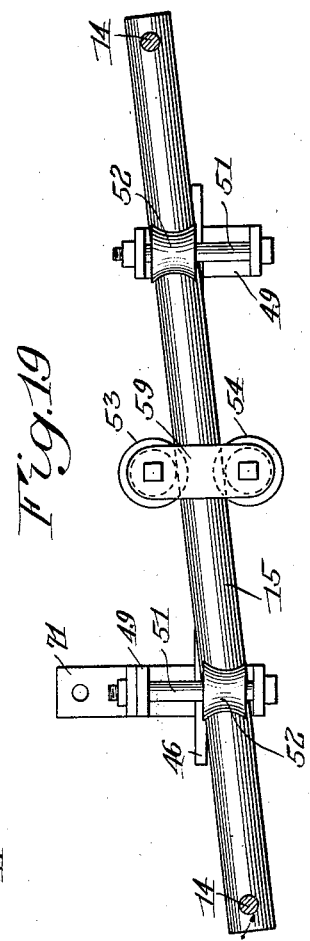
INVENTOR
Henry J. Neufang
By Edward H. Cumpston
his ATTORNEY Feb. 2, 1932. H. J. NEUFANG 1,843,780
PLOW
Filed July 2, 1930 7 Sheets-Sheet 5
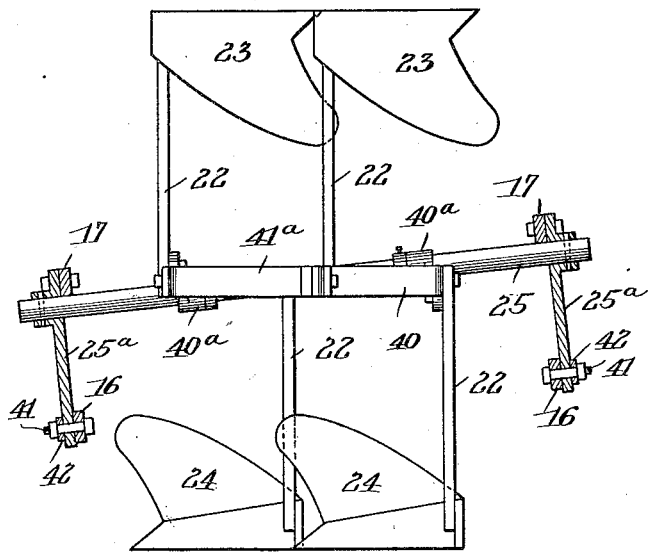
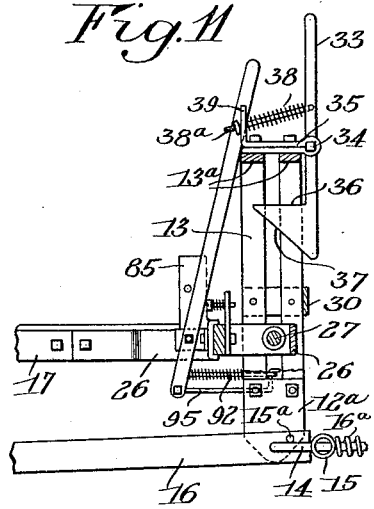
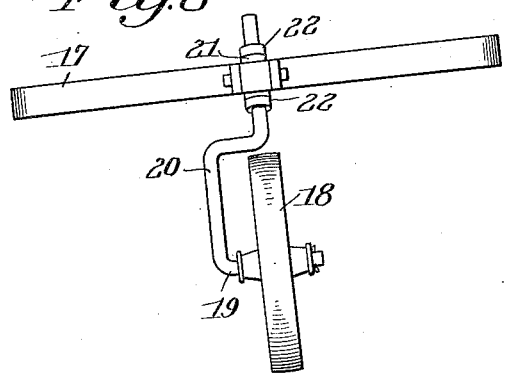
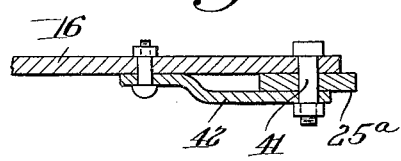
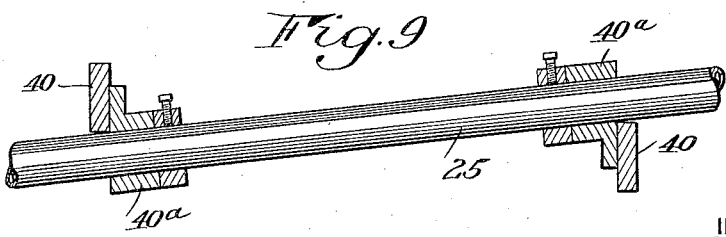
INVENTOR
Henry J. Neufang
BY
Edward N. Dumpston
his ATTORNEY

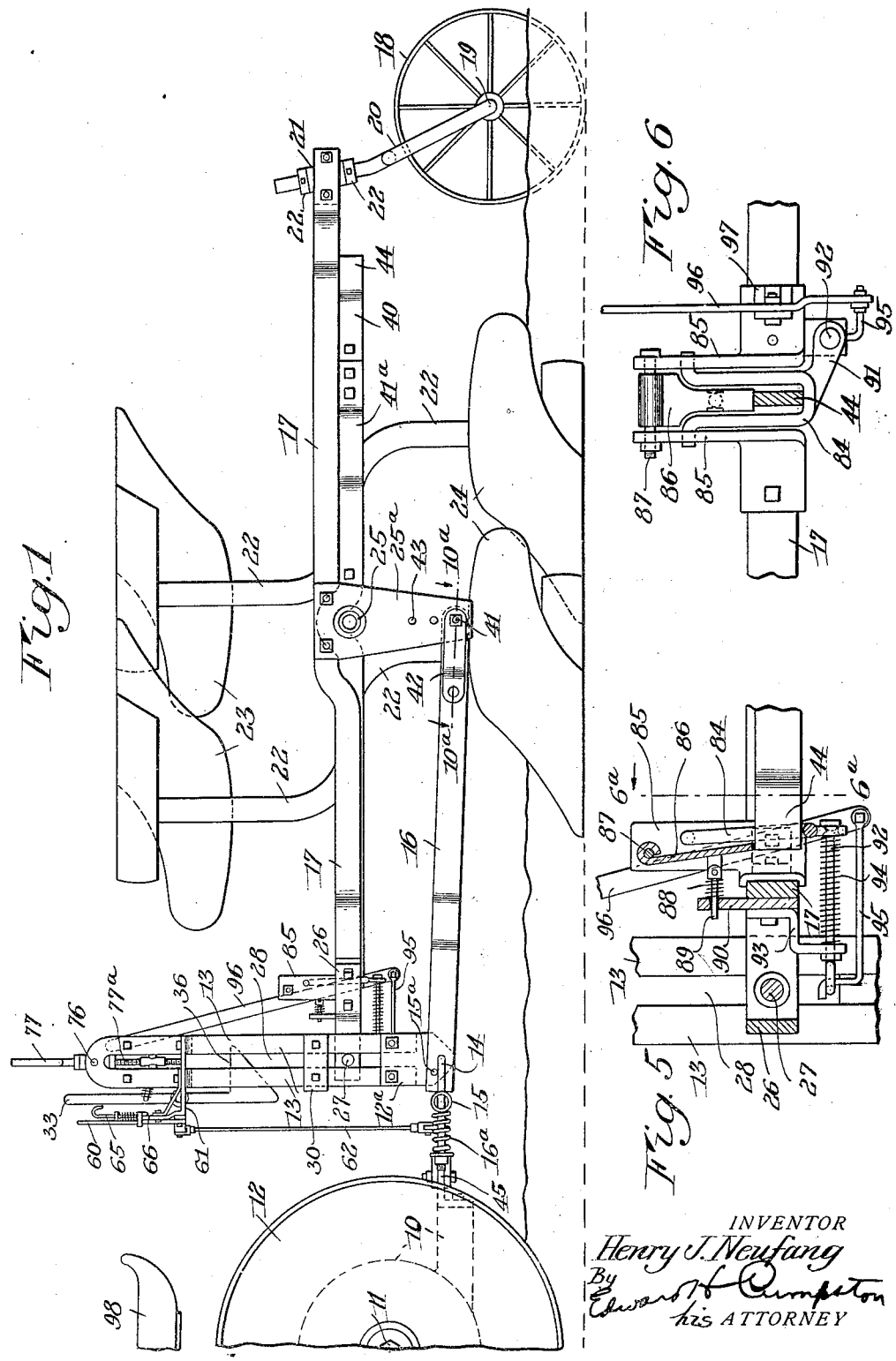

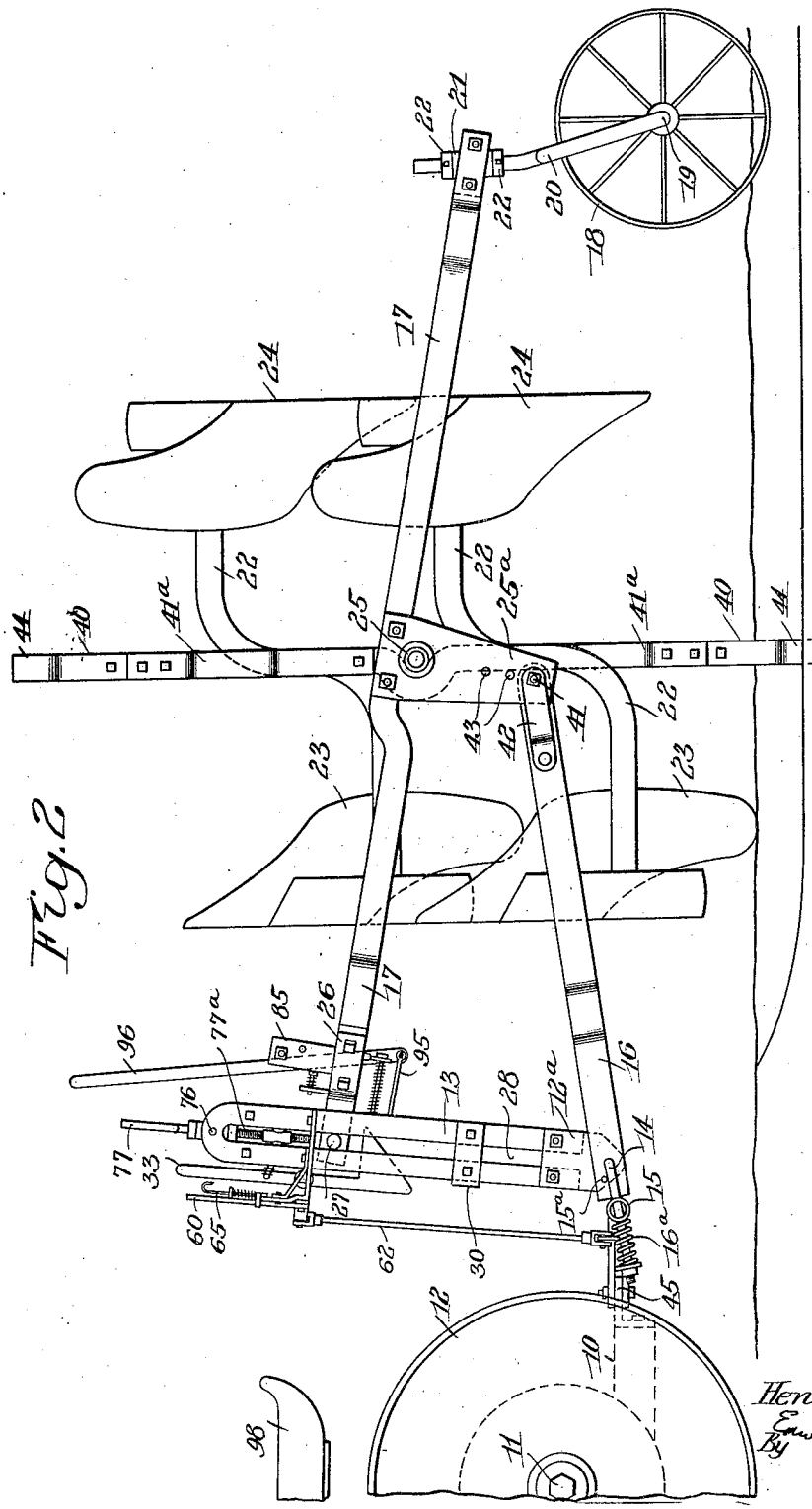

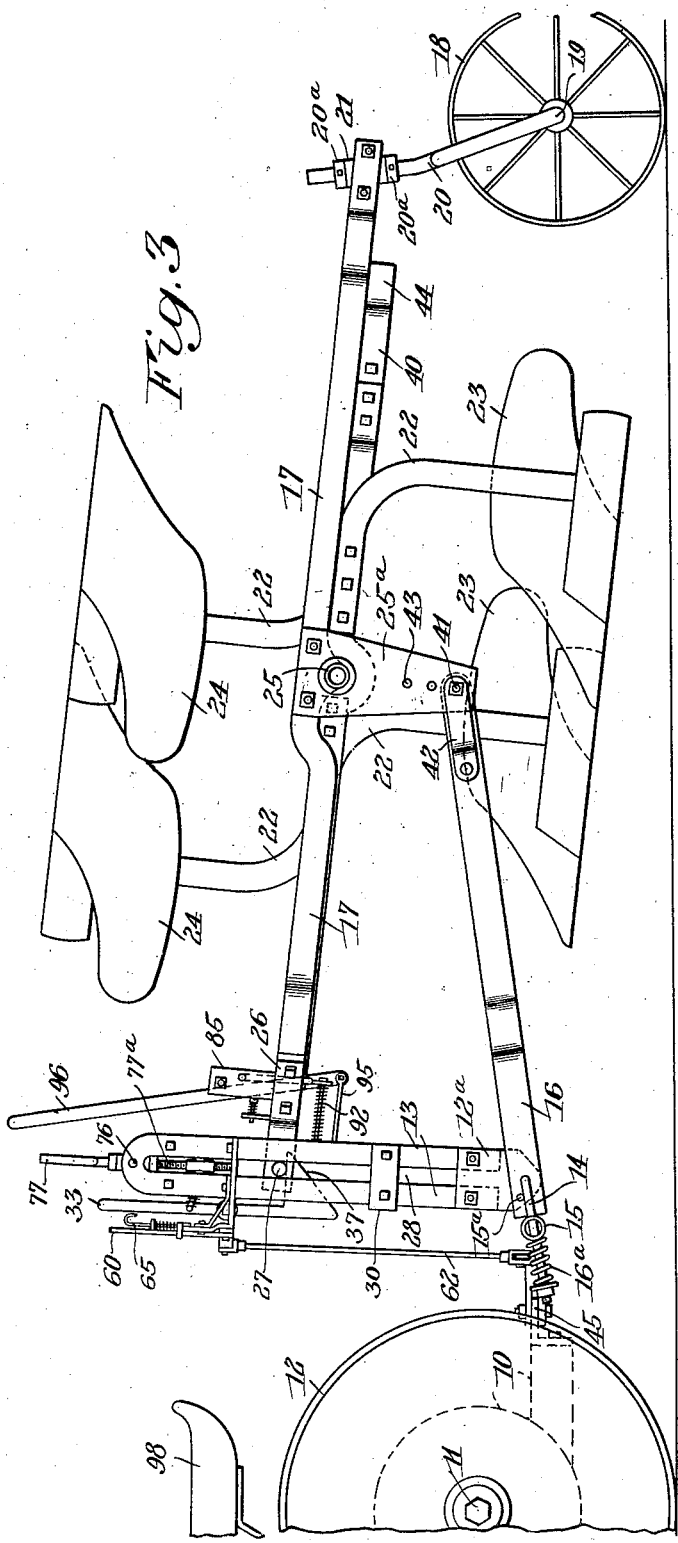

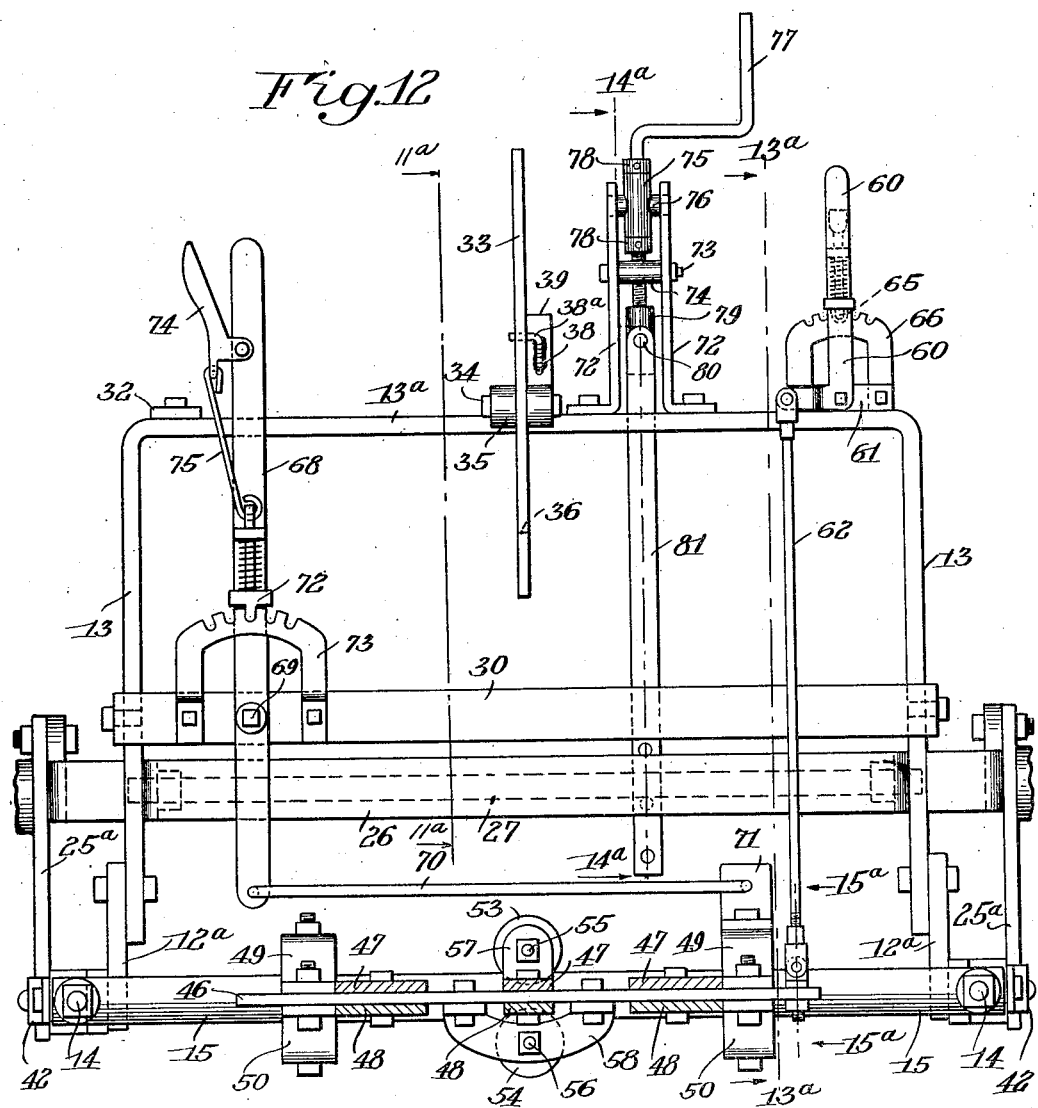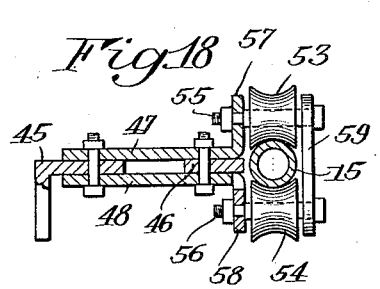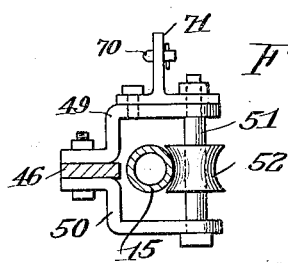

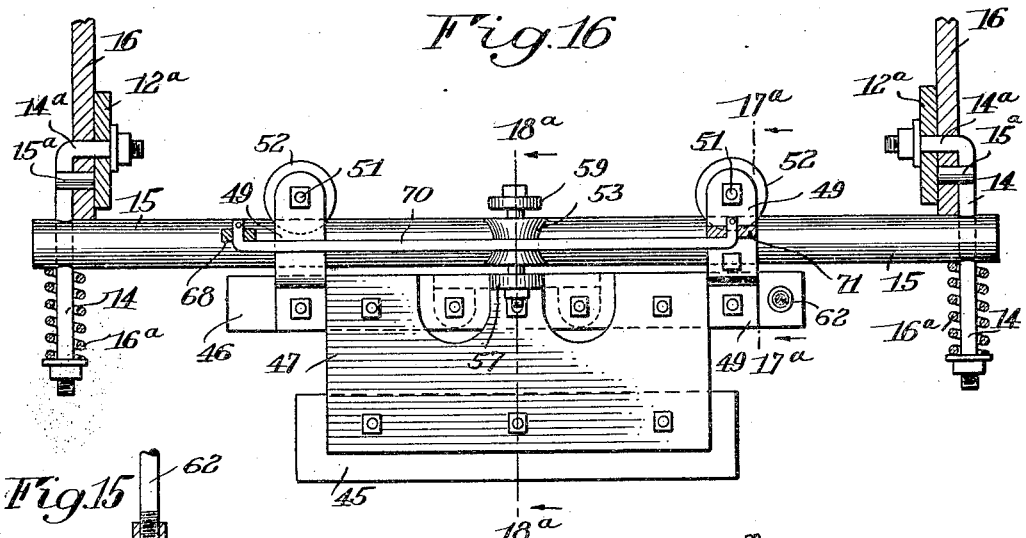

Patented Feb. 2, 1932

1,843,780

UNITED STATES PATENT OFFICE

HENRY J. NEUFANG, OF ATLANTA, NEW YORK, ASSIGNOR TO BOGGS PLOW COMPANY, INC., OF ATLANTA, NEW YORK, A CORPORATION OF NEW YORK

PLOW

Application filed July 2, 1930. Serial No. 465,404.

The present invention relates to ground cultivating machines and has for its object to provide an improved machine of this class which is of simple construction, convenient to operate, efficient in service and which can be manufactured at a relatively low cost.

A further object of the invention is to provide in a ground cultivating machine angularly disposed upstanding guide and vertically disposed frames arranged for attachment to a source of draft power, the adjustable frame being guided by the upstanding frame and carrying rotary ground cultivating implements, said adjustable frame being elevated and the implements thereon being rotated by the travel of the machine as for example by contact of the implements with the ground during advancement of the machine.

A further object of the invention is to provide an improved reversible plow, having right and left hand plowing implements, with relatively adjustable mechanisms one of which forms a support for the implements and is adjustable vertically upon the other to elevate the implements during advancement of the machine through cooperation of certain parts with the ground.

A further object of the invention is to provide a ground cultivating machine of the reversible plow type embodying main and secondary frames and connecting means for attaching said frames to suitable traction means, the main frame having its rear end supported by ground engaging means and its front end adjustable vertically to a predetermined position upon the connecting means to which it is adjusted by rotation of the secondary frame while operating in contact with the ground during advancement of the machine.

A further object of the invention is to provide improved means for effecting adjustment of said main and secondary frames laterally with respect to the traction means and also means for tilting or inclining said frames relative to the horizontal as may be required under certain conditions of operation.

A further object of the invention is to provide improved means for flexibly connecting the main frame with a tractor or other frame whereby to permit of relative movement between said frames and also to provide means for effecting adjustment of one of the frames relative to another.

A further object of the invention is to provide in a ground cultivating machine improvements by which a rotary implement carrying frame is arranged to cooperate with the ground during advancement of the machine whereby to elevate the implements from a lowered operating position to a point above the ground for support by means operating to guide and hold said frame in raised position.

A further object of the invention is to provide in a ground cultivating machine of the reversible plow type a combined connecting frame and draft mechanism arranged for attachment to a suitable traction device and serving as a means for connecting therewith a plow carrying frame the front end of which is adjustable vertically upon the connecting frame and the rear end of which is provided with a caster wheel or other suitable supporting means operating in engagement with the ground when the front end of said frame is raised to a predetermined position.

A still further object of the invention is to provide in a ground cultivating machine a draft mechanism having thereon an upstanding guide frame and in rear of which is disposed a plow frame having draft links connected therewith intermediate its ends and extending forward and connected with said draft mechanism, said plow frame having its front end arranged to travel vertically upon said guide frame and adapted to be supported in a predetermined elevated position thereon by means operating automatically to engage and hold the same.

To these and other ends the invention resides in certain improvements and combinations of parts, all as will be hereinafter more fully described, the novel features being pointed out in the claims at the end of the specification.

In the drawings:

Fig. 1 is a side elevation of a machine embodying the invention, the plowing implements being shown in lowered operating position;

Fig. 2 is a side elevation showing the approximate position assumed by the main frame when the reversible frame has been rotated through an angle of approximately 90°;

Fig. 3 is a side elevation of the machine showing the front end of the plow carrying frame in raised position;

Fig. 4 is a part sectional plan of the machine including the means for connecting it with a tractor or the like;

Fig. 5 is a fragmentary sectional elevation drawn to an enlarged scale and taken centrally through the holding means for the rotary plow frame substantially on line 5a—5a of Fig. 4;

Fig. 6 is a sectional elevation taken on the line 6a—6a of Fig. 5;

Fig. 7 is a part sectional elevation showing the relative positions of the right and left hand plows and their relation with respect to the means by which they are maintained on substantially an even keel during operation with one wheel of the tractor operating within the furrow, the section being taken substantially on line 7a—7a of Fig. 4 with the rotary plow frame shown in elevation.

Fig. 8 is a rear end elevation of the main frame and caster wheel for supporting the rear end thereof;

Fig. 9 is an enlarged fragmentary section taken on line 9a—9a of Fig. 1 showing the offset bearing arrangement for the rotary plow frame;

Fig. 10 is a sectional plan taken on line 10a—10a of Fig. 1 and drawn to an enlarged scale;

Fig. 11 is a sectional elevation illustrating the holding device for supporting the main frame in a predetermined adjusted position taken substantially on line 11a—11a of Fig. 12;

Fig. 12 is a front elevation of the machine shown detached from the tractor with the plows omitted;

Fig. 13 is a sectional elevation on line 13a—13a of Fig. 12;

Fig. 14 is a sectional elevation on line 14a—14a of Fig. 12;

Fig. 15 is a sectional elevation drawn to an enlarged scale and taken on line 15a—15a of Fig. 12;

Fig. 16 is a part sectional plan drawn to an enlarged scale and showing the draft mechanism by which the machine is connected with a tractor or other pulling means the section being taken substantially on line 16a—16a of Fig. 1;

Fig. 17 is a transverse section taken on line 17a—17a of Fig. 16;

Fig. 18 is a transverse section taken on line 18a—18a of Fig. 16; and

Fig. 19 is a view in elevation showing the draft bar adjusted to one of its extreme inclined positions.

Referring to the drawings 10 represents a portion of a tractor frame mounted upon an axle 11 supported by ground engaging traction means, such as the traction wheels 12 shown in Fig. 4, said frame forming through the medium of parts hereinafter described means for supporting an upstanding yoke shaped frame 13. The frame 13 comprises spaced sections connected at their extremities by plate members 12a which are pivotally mounted upon the angular portions 14a of a pair of draft arms 14, as best shown in Figs. 13 and 16. A main draft bar 15 is slidably mounted upon said draft arms for operation against the resistance of the springs 16a carried by the arms, said springs when the pressure thereon is relieved serving to urge the draft bar in engagement with the front ends of a pair of draft links 16, the rear ends of which are connected with the main plow carrying frame 17 as described hereinafter. It will be noted that a rotary movement of the draft bar 15 takes place relative to the tractor frame and the upstanding frame 13 when the plow frame is moved between the positions shown in Figs. 1 and 3 which is produced by the draft arms 14 under the action of the stops 15a fixed to the draft links 16 and overlying the arms as best understood in Fig. 16.

The rear end of the main frame is supported by any suitable means preferably a caster wheel 18 arranged to run in the furrow during the plowing operations. The wheel is mounted on an axle 19 carried by a standard 20 journalled in an inclined bearing 21 on the rear end of the main frame and adjustable vertically within the bearing to vary the position of the wheel with respect to the ground, as may be required when operating the plows at different depths from time to time. The adjustment is preferably made by loosening the set screws of the collars 20a on the standard 20 which engage the top and bottom portions of the bearing 21, and raising and lowering the standard as may be required.

The ground cultivating implements shown in the drawings preferably comprise right and left hand plows, one set being indicated generally at 23, and the other at 24, the latter being shown in operating or plowing position in Fig. 1. The secondary frame including the plows is mounted for rotation in one direction through a circle between the sides of the main frame 17, and about a transverse axis in advance of the frame supporting wheel 18, the supporting means for the secondary frame being in the form of a transverse bar 25 carried by depending arms or brackets 25a suitably connected with said frame. The secondary frame when released is rotated during advancement of the machine through cooperation of certain parts with the ground as described hereinafter, the main frame, during the rotating period being elevated from the operating position shown in Fig. 1 to that shown in Fig. 3, in which the plows are shown raised clear of the ground.

The front end of the main frame has secured thereto an extension, preferably comprising a yoke-like member 26, the side portions of which carry a transverse member 27 in the form of a rod, the ends of which are movable in slots or guideways 28 formed by the upstanding spaced portions of the frame 13, said side portions being preferably formed integral with the transversely extending portions 13a of the upstanding frames. The side portions are also connected by a tie-bar 30 and the portions 13a by a tie-plate 32, Fig. 12, and other parts described hereinafter.

The main implement carrying frame, when moved to the elevated position shown in Fig. 3, is supported by a suitable holding device such for example as a lever 33 pivoted at 34 upon a bracket 35 which is carried by and serves to connect the spaced horizontal portions 13a of the guide frame 13 at one point as indicated in Fig. 11. The supporting lever is provided with a shoulder 36 for receiving the rod 27 when the main frame is moved to elevated position, the lever having a cam portion 37 engaged by the rod when said frame is elevated, whereby the lever is automatically displaced. The lever is returned to normal position by a spring 38 interposed between the handle or operating portion of the lever and an upstanding portion 39 of the bracket 35, Fig. 11, the spring being supported by a rod 38a pivotally connected with the lever and free to slide in an opening formed in the portion 39 of the bracket 35. The rear ends of the draft links 16 are connected with the depending plates or brackets 25a on the main frame 17 by means of bolts 41 as indicated in Fig. 3. The links have straps 42 secured thereto through the rear ends of which the pivot bolts 41 extend, Fig. 10. The rear ends of the links are made vertically adjustable upon the plates 25a by use of different holes 43 in the latter which are located one above another for receiving the pivot bolts whereby the position of the links may be regulated according to the height of the front frame 10 for supporting the upstanding guide frame 13.

The links 16, the upstanding frame 13, and the draft means in advance thereof constitute a suitable connecting means between the main frame 17 and the tractor. The upstanding frame constitutes the guide means for the front end of the main frame in its raising and lowering movements between the positions indicated in Figs. 1 and 3. While it is preferred to directly support the connecting means upon the rear end of a tractor it will be understood that the same may be supported by a pair of small wheels not shown, placed beneath said connecting means and suitably coupled with the tractor either by the draft mechanism provided or by any other suitable means.

It will be understood that upon release of the locking lever 33 the main frame and the plows thereon will descend by gravity, the landside of the rear plow when moving into engagement with the ground operating to check and steady the downward movement of said frame, the rear end of which is supported by the wheel 18 arranged to operate in the furrow. When the main frame is thus lowered and the machine advanced by forward movement of the tractor the plows will enter the ground and the plowing operations begun immediately.

The connecting parts between the draft bar 15 and the tractor frame 10 comprise in the present instance front and rear transversely extending members 45 and 46 suitably connected, as for example, by a pair of upper and lower plate members 47 and 48 and a suitable number of bolts as shown. The transversely extending member 45 is preferably in the form of an angle bar which is suitably connected with the frame 10 of the tractor. The rear plate member 46 is provided adjacent each end with upper and lower brackets 49 and 50 connected by a bolt 51 on which is slidably mounted for vertical movement a roller 52 arranged to travel upon the rear face of the draft bar 15. By mounting the rollers 52 for vertical movement upon the bolts 51 the draft bar 15 is free to be rocked in a vertical plane whereby to effect a variation in the inclination of the main frame under certain operating conditions. For example, at the beginning of the plowing operations where the first furrow is to be plowed the wheels of the tractor will be operated upon unplowed ground and consequently there will be a different angle between the fixed and shiftable draft members 46 and 15 respectively than when plowing the second furrow with one wheel of the tractor operating within the previously plowed furrow. It will be seen, therefore, that under these conditions there will be a difference in the inclination of the main plow carrying frame and the tractor frame and that adjustment of one relative to another becomes necessary. This difference of inclination between the tractor frame 10 and the plow frame 17 can be readily taken care of by a rocking movement of the latter in which the draft bar 15 will swing in a vertical plane upon the central rollers 53 and 54 which form a pivotal support for the bar. The bar is also free to rotate about its own axis between the central rollers 53 and 54. It will be understood that a rocking movement of the bar 15 will effect a corresponding movement of the guide frame 13 and the main frame 17. The upper roller 53 is mounted upon a pivot bolt 55 and the lower roller 54 upon a similar bolt 56, said bolts being connected respectively with an upstanding lug 57 on the upper draft member 47 and a bracket 58 suitably connected with the lower draft member 48. The bolts are connected in rear of the rollers by a tie-member 59, Fig. 18.

The means for effecting relative adjustment between the transverse bar 46, fixed with respect to the tractor, and the draft bar 15 comprises a bell crank lever 60 pivoted at 61 on the transverse portion 13a of the upstanding frame 13 and connected with a link 62 having at its lower end a pin 63 extending through the head of an eye bolt 64 which in turn is connected with one end of the transverse bar 46. The bell crank lever 60 is held in different adjusted positions by a spring pressed latch 65 arranged to engage in the notches of a segment 66 on the bracket 61 as indicated in Figs. 12 and 13. It will be seen that upon swinging the lever in one direction or the other that relative movement between the guide frame 13 and the transverse draft bar 46 will take place, and since the bar is connected with the tractor frame and is not free to move relative thereto the guide frame will be tilted in the desired direction and likewise the links 16 connected therewith together with the main frame 17. The direction in which the lever is moved will, of course, depend on the direction of movement required for tilting the plow carrying frame to bring it into proper relationship with respect to the tractor frame. However, after the first furrow is completed and the adjustment made as described, the plane of operation of the main frame remains fixed with respect to the tractor frame until the conditions of operation are changed at which time the proper adjustments can be made through operation of the lever 60. It will be understood that in the operations described above the plows when reversed will always operate on substantially an even keel due to the offset bearings for the rotary frame indicated in Fig. 9, and arrangement which will be described hereinafter.

In the present arrangement, since the main and connecting frames attached to the tractor operate centrally with respect thereto as indicated in Fig. 4, no lateral shifting of said frames with respect to the tractor is required upon reversal of the plows for the reason that each set of plows is so positioned with respect to one of the tractor wheels as to assume proper position relative thereto upon reversal of the rotary frame at the end of each furrow. In other words, the front plow of each set occupies at all times the proper position laterally with respect to one wheel and will therefore turn the dirt into the previously plowed furrow in which said wheel is operating. However, in certain types or makes of tractors if the distance between the treads of the wheels should be greater or less than that between the wheels of the tractor shown, lateral adjustment of the main and connecting frames would be required in cases where the wheels are to be operated within the furrow. If, however, with the tractor used neither wheel is operated within the furrow, the lateral shifting of the main and connecting frames, if found necessary, may be effected with the means disclosed. This means comprises a lever 68 pivoted at 69 on the frame member 30, the lower end of the lever being connected with one end of the link 70, the other end of which is connected with a member 71 disposed on one of the bracket members 49 connected with the transverse bar 46, Fig. 4, which is fixed with respect to the tractor frame. The lever 68 is provided with a latch 72 engaging one of the notches of a segment 73, the latch being spring pressed and operated by a hand grip 74 connected with the latch by a link 75 as shown. Since the part 71 with which the link 70 is connected is fixed with respect to the tractor, operation of the lever will exert sufficient pressure upon the upstanding frame 13 to move it laterally in the desired direction, such movement being permitted since the draft bar 15 is free to move longitudinally between the guide rollers carried by the tractor frame. Movement of the guide or connecting frame in this manner with the machine advancing and the main frame in the elevated position shown in Fig. 3, will cause lateral shifting of said main frame, the rear end of which will also be free to shift laterally since it is supported by a caster wheel free to move in all directions.

Means is provided for effecting a variation in the depth at which the plows are to be operated, this variation being preferably effected by lowering or raising the front end of the main frame to the extent required. The means for accomplishing this result is best shown in Figs. 12 and 14 and comprises a pair of upstanding arms 72 suitably secured upon the transverse portions 13a of the guide frame 13 and connected intermediate their ends by a pair of bolts 73 having thimbles 74 thereon for properly spacing and holding said arms apart. A tubular member 75 is interposed between the arms and is provided with trunnions 76 supported by and free to rotate with the upper ends of the arms. A crank 77 is rotatably mounted within the tubular member and is held against longitudinal movement therein by a pair of upper and lower collars 78 adjustable upon the crank to permit the latter to be adjusted vertically within the tubular member when desired. The lower end of the crank is threaded at 77a and extended through a nut 79 carrying trunnions 80 projecting through openings in the upper ends of a pair of links 81 which extend downwardly on opposite sides of the transverse rod 27 supported by the yoke-like extension 26 of the main frame 17, Figs. 4 and 14. The links are provided with several pairs of oppositely positioned holes 82 for receiving a pin 83 which extends beneath the rod 27 to limit downward movement of the front end of the main frame whereby to control or regulate the depth at which the plows operate. The rod 27 may be adjusted vertically by shifting the pin 83 from one set of holes to another and a finer adjustment may be afforded by operating the crank to raise or lower the links 81 through rotation of the screw 77a within the head 79, which is held against rotation about its axis by means of the links the latter being prevented from turning by the transverse portions 13a of the guide frame 13. It will be seen, therefore, that since the rod 27 rises on the pin 82 and since the vertical position of the later may be easily varied by turning the crank 77 that the depth at which the plows operate may be regulated as desired.

The rotary or secondary frame includes the opposite sets of plowing implements 23 and 24, the supporting beams 22 therefor, the angular shaped frames 40 with which the beams are connected and the members 41a for bracing said frames. The frames 40 have fixed thereon bearing members 40a journalled upon the transverse supporting shaft 25 about the axis of which the secondary frame is free to rotate to effect reversal of the plows. The bearings 40a are offset one with respect to another as shown in Fig. 9 to take care of the difference in the operating positions of the shaft, which is inclined in one direction when one wheel is operating within the furrow and in a different direction when the other wheel operates within the furrow. By offsetting the bearings of the rotary frame as shown, said frame in either of the positions to which it is adjusted, will occupy a substantially horizontal position regardless of which wheel may be operating within the furrow. Consequently the plows will, in either case, be in position to operate on substantially an even keel.

Upon release of the rotary frame while the machine is moving forward, one or the other of the extreme end portions 44 thereof will move into engagement with the ground and as the machine continues to advance completion of the rotary movement will be effected and during such movement the rotary frame, through cooperation with the ground will raise the main frame to the position shown in Fig. 3, where it is locked in position by the automatic latch or lever 33 with the plows elevated above the ground.

Upon completion of the rotary movement of the plow frame one or the other end portions thereof will swing into engagement with the holding means for the frame which is best shown in Figs. 5 and 6. This means comprises a yoke shaped member 84 disposed between and pivotally supported by a pair of angular shaped bracket members 85 secured upon the transverse portion of the main frame 17. The rotary frame is prevented from swinging upwardly by a latch member 86 pivoted between the brackets upon a bolt 87 which serves to connect the upper ends of the brackets. The latch member is held in latching position as shown in Fig. 5 by a spring 88 on a stem 89 pivotally connected with the latch and guided for movement within an upstanding member 90 secured to the transverse portion of the main frame. The latch member 86 is displaced by the ends 44 of the rotary frame when moved downwardly into engagement therewith and is subsequently returned to latching position by the spring when said frame end reaches its lowermost position within the yoke 84. Release of the secondary frame for rotary movement is effected by swinging the lower end of the yoke forwardly to clear the frame which is accomplished through the medium of an arm 91 on the yoke having a forwardly extending operating member 92 guided by a bracket 93. The operating member has a spring 94 thereon extending between the bracket and the arm 91 for returning the yoke to normal position after release. Movement of the operating member 92 to release the yoke is effected by means of a rod 95 having its forward end bent upwardly and extended through a loop on the operating member. The rear end of the rod is pivotally connected with the lower end of a lever 96 which is pivoted intermediate its ends upon a bracket 97 preferably secured upon one of the yoke supporting brackets 85. The lever 96 extends upwardly in rear of and to a point above the transverse portion 13a of the guide frame 13 and can be readily reached by the operator from the seat 98 of the tractor when it is desired to release the rotary frame to effect reversal of the plows.

In the operation of the plow, assuming that the machine is nearing the end of a furrow, the operator, from the seat of the tractor, will shift the upstanding lever 96 to release the rotary or secondary frame. Since at this time the plows are operating within the ground, a rotary movement will be imparted to the secondary frame as the machine continues to advance and the front end of said frame will swing downwardly into engagement with the ground and through cooperation therewith will raise the main frame to the position shown in Fig. 2. In moving to this position the rod 27 on the front end of said main frame will displace the lever 33, which will be automatically returned by the spring into position to receive the rod as indicated in Fig. 3 when the rear end of the main frame drops as the machine continues to advance. During the advancement of the machine from the position shown in Fig. 2 the rear plow 23 will, through cooperation with the ground, continue the rotating movement of the secondary frame to swing it into the position shown in Fig. 3 where it will displace the latch 86 and move into position to be supported by the yoke 84, Fig. 5. At this time the wheel 18 will be in engagement with the ground to support the rear end of the main frame with the plows in raised position above the ground. The tractor is then turned around to begin the plowing of the next furrow, at which time the lever 33 is tripped to permit the plow frame to drop by gravity, the descent being checked by engagement of the landside of the rear plow 23 with the ground and as the machine is advanced the plows will enter the ground and move to the desired depth, which may be regulated at any time by turning the crank 77 to vary the position of the pin 83 on which the rod 27 rests, Fig. 14. It will be understood that during the plowing operations the castor wheel 18 will travel within the furrow and that it can be adjusted vertically to correspond to the different depths at which the plows may be operated. The operations described above are the normal operations required in the use of the machine, it being understood that the shifting of the plow laterally of the tractor by operation of the lever 68, or the tilting of the main and connecting frames by means of the lever 60 can be readily effected when necessary by the use of these instrumentalities, arranged to be conveniently operated from the seat of the tractor.

It will be noted that with the plow in the position shown in Fig. 3 that the draft links 16, the upstanding frame 13, and the main frame 17 constitute a more or less rigid structure operating to support the plows, a portion of the weight of which is carried by the rear wheel 18. The front end of the machine is supported by the tractor frame preferably through the medium of the draft mechanism carried thereby. With this arrangement the plows occupy a position relatively close to the tractor and the overall length of the machine is thus reduced to a minimum. The machine can therefore be turned at the end of the furrow in a comparatively limited space, which is obviously advantageous in a ground cultivating machine of this type. Another advantage is that the operating controls are all positioned close to the seat of the tractor in convenient reach of the operator so that he can more readily control the movements of both machines.

In the plowing operations, should the plows strike an obstruction, the cushioning effect of the springs 16a will serve to prevent breakage of the parts and furthermore under such conditions the machine can be backed up until the plow points are clear of the obstruction, under which conditions the front end of the main frame will be automatically elevated to the position shown in Fig. 3, thus permitting the machine to be moved forward with the plows in position to pass over the obstruction, after which they can be readily lowered into plowing position by tripping the lever 33.

It will be seen that certain advantages are afforded in the economy of manufacture of the present plow over others of the reversible type by the omission of the usual crank axle and supporting wheels therefor, together with the wheel operated clutch mechanisms for raising the plow carrying frame.

I claim:

1. In a ground cultivating machine, the combination of a main frame, a support for the rear end of said frame, a secondary frame including ground working implements rotatably mounted upon said main frame, means for connecting the front portion of said main frame with traction means including relatively movable parts permitting said front portion to move from a lowered to a predetermined raised position whereby to elevate said implements above the ground, and releasable means for holding the secondary frame against rotation, said secondary frame when released operating through contact with the ground during advancement of the machine to raise the front portion of said main frame to said predetermined position.

2. In a ground cultivating machine, the combination of a main frame, a secondary frame including ground working implements mounted for rotation upon said main frame, wheel means disposed rearwardly of the axis of rotation of said secondary frame for supporting the rear end of said main frame, means including relatively movable parts for connecting the front portion of said main frame with traction means, said parts permitting said front portions to move from a lowered to a predetermined raised position whereby to lift said implements above the ground, releasable means for holding the secondary frame against rotation, said secondary frame when released operating through contact with the ground during advancement of the machine to raise the front portion of said main frame to said predetermined position and means for holding said main frame in said raised position.

3. In a ground cultivating machine, the combination of a main frame having ground engaging supporting means adjacent its rear end, an upstanding frame adjacent the front end of said main frame upon which said end is movable from a lowered operating position to a raised position, said upstanding frame being adapted for connection with a traction device, and a secondary frame including ground working implements arranged to rotate upon the main frame through contact with the ground during advancement of the machine and operating while rotating to elevate the front end of the main frame to said raised position.

4. In a ground cultivating machine, the combination of a main frame having ground engaging supporting means adjacent its rear end, an upstanding frame adjacent the front end of said main frame upon which said end is movable from a lowered operating position to a raised position, supporting means for said upstanding frame adapted for connection with a traction device and with which said upstanding frame is pivotally connected, a secondary frame including ground working implements arranged to rotate upon the main frame through contact with the ground during advancement of the machine and operating while rotating to elevate the front end of the main frame to said raised position, and holding means operating automatically to engage and support said main frame in said raised position when moved thereto.

5. In a ground cultivating machine, the combination of a main frame having ground engaging supporting means adjacent its rear end, an upstanding frame adjacent the front end of said main frame upon which said end is arranged for movement from a lowered to a predetermined raised position, said upstanding frame being adapted for connection with a traction device, a secondary frame including ground working implements arranged to rotate upon the main frame through contact with the ground during advancement of the machine and operating while rotating to raise the front end of the main frame to said predetermined position, and means for adjusting the front end of said main frame upon said upstanding frame to regulate the depth of operation of the implements.

6. In a ground cultivating machine, the combination of a main frame, right and left hand plows rotatably mounted upon said main frame for movement to and from a predetermined operating position, an upstanding frame adjacent the front end of said main frame upon which said main frame is adjustable from a substantially horizontal operating position to a raised position inclined to the horizontal in which the plowing implements are elevated above the ground, and supporting means for said upstanding frame arranged for attachment to a traction device.

7. In a ground cultivating machine, the combination of a main frame, right and left hand plows rotatably mounted upon said main frame for movement to and from a predetermined operating position, an upstanding frame adjacent the front end of said main frame upon which said main frame is adjustable from a substantially horizontal operating position to a raised position inclined to the horizontal in which the plowing implements are elevated above the ground, means for holding the front end of said main frame in raised position, and means for adjusting said main frame to different operating positions upon said upstanding frame.

8. In a ground cultivating machine, the combination of a main frame, right and left hand plows rotatably mounted upon said main frame for movement to and from a predetermined operating position, an upstanding frame adjacent the front end of said main frame upon which said main frame is adjustable from a substantially horizontal operating position to a raised position inclined to the horizontal at which the plowing implements are elevated above the ground, supporting means for said upstanding frame comprising a transversely extending element having parts pivotally supporting said upstanding frame, and means for connecting said element with a traction device.

9. In a ground cultivating machine, the combination of a main plow carrying frame, mechanism for supporting the front portion of said frame comprising draft means arranged for attachment to a traction device and an upstanding frame adjustable transversely upon said draft means and forming a guide frame upon which said front portion of the main frame is adjustable from a lowered operating position to a predetermined raised position in which the plowing implements are elevated above the ground, and means for moving said upstanding frame transversely upon said draft means.

10. In a ground cultivating machine, the combination of a main plow carrying frame, mechanism for supporting the front portion of said main frame comprising draft means arranged for attachment to a traction device and an upstanding frame mounted for a tilting movement upon said draft means whereby to vary the inclination of said main frame relative to the horizontal, said upstanding frame comprising guide means upon which said front portion of the main frame is adjustable from a lowered operating position to a predetermined raised position in which the plowing implements are elevated above the ground, and means for effecting a tilting movement of said upstanding frame upon said draft means.

11. In a ground cultivating machine, the combination of a main plow carrying frame, mechanism for supporting the front portion of said main frame comprising draft means arranged for attachment to a traction device and an upstanding frame pivoted to swing upon said draft means, said upstanding frame forming guide means upon which said front portion of the main frame is adjustable from a lowered operating position to a predetermined raised position in which the plowing implements are elevated above the ground, and means for varying the position of said front portion of the main frame upon the upstanding frame to regulate the depth at which the plows operate.

12. In a ground cultivating machine, the combination of a main frame, an upstanding frame upon which the front portion of said main frame is adjustable from a lowered operating position to a predetermined raised position, ground cultivating implements carried by said main frame adapted to occupy a position above the ground when said front frame portion is moved to said raised position, supporting means for said upstanding frame adapted for attachment to a traction device and upon which the upstanding frame is laterally adjustable, and means for effecting lateral adjustment of said upstanding frame upon said supporting means.

13. In a ground cultivating machine, the combination of a main frame, an upstanding frame upon which the front portion of said main frame is adjustable from a lowered operating position to a predetermined raised position, ground cultivating implements carried by said main frame adapted to occupy a position above the ground when said front frame portion is moved to said raised position, supporting means for said upstanding frame arranged for attachment to a traction device, said upstanding frame being mounted upon said supporting means both for a tilting and a lateral movement thereon, and operating devices for effecting said tilting and lateral movements.

14. In a ground cultivating machine, the combination of a main frame, an upstanding frame upon which the front portion of said main frame is adjustable from a lowered operating position to a predetermined raised position, ground cultivating implements carried by said main frame adapted to occupy a position above the ground when said front frame portion is moved to said raised position, supporting means for said upstanding frame including means for attaching it to a traction device and upon which the upstanding frame is arranged for tilting movement whereby to vary the inclination of said main frame relative to the horizontal, and means interposed between said attaching means and said upstanding frame for tilting the latter upon the former.

15. In a ground cultivating machine, the combination of a main frame, mechanism for connecting the front portion of said main frame with traction means including a support arranged for attachment to said traction means and an upstanding frame connected with said support for adjustment laterally thereon, means for effecting lateral adjustment of said upstanding frame upon said support comprising a part connected with the support and an operating part therefor connected with said upstanding frame, said front portion of the main frame being movable from a lowered to a raised position upon said upstanding frame, and ground working implements carried by said main frame and elevated to a position above the ground when the front portion of said main frame is moved to said raised position.

16. In a ground cultivating machine, the combination of a main frame, mechanism for connecting the front portion of said main frame with traction means including a support arranged for attachment to said traction means and an upstanding frame mounted for a tilting movement upon the support to effect a corresponding tilting movement of the main frame, means for tilting said upstanding frame upon said support including a part connected with the support and an operating part therefor connected with the upstanding frame, said front portion of the main frame being movable from a lowered to a raised position upon said upstanding frame, and ground working implements carried by said main frame and elevated to a position above the ground when the front portion of said main frame is moved from said lowered to said raised position.

17. In a ground cultivating machine, the combination of a main frame, right and left hand plows rotatably mounted upon said main frame for movement to and from a predetermined operating position, an upstanding frame adjacent the front end of said main frame upon which said main frame is adjustable from a lowered operating position to a raised position inclined to the horizontal at which the plowing implements are elevated above the ground, supporting means for said upstanding frame comprising parts pivotally supporting the same, a transversely extending draft bar slidable upon said parts, means yielding resisting movement of the bar, and means for connecting said bar with a traction device.

18. In a ground cultivating machine, the combination of a main frame, right and left hand plows rotatably mounted upon said main frame for movement to and from a predetermined operating position, an upstanding frame adjacent the front end of said main frame upon which said main frame is adjustable from a lowered operating position to a raised position inclined to the horizontal at which the plowing implements are elevated above the ground, supporting means for said upstanding frame comprising parts pivotally supporting the same, a transversely extending draft bar slidable upon said parts, means yieldably resisting movement of the bar, means for connecting said bar with a traction device, said means including parts forming a support for the bar on which it is arranged for a tilting movement in a vertical plane to effect a corresponding tilting movement of said main and upstanding frames, and operating means for effecting said tilting movement.

19. In a ground cultivating machine, the combination of a main frame having ground working implements thereon, an upstanding frame upon which the front portion of said main frame is mounted for movement from a lowered operating position to a raised position whereby to elevate the implements, parts for supporting said upstanding frame, a transversely extending bar forming a support for said parts, and supporting means for said bar upon which it is free to rotate about its own axis to permit of a limited rocking movement of the parts upon which said upstanding frame is mounted.

20. In a ground cultivating machine, the combination of a main frame having ground working implements thereon, an upstanding frame upon which the front portion of said main frame is mounted for movement from a lowered operating position to a raised position whereby to elevate the implements, a support arranged for attachment to a traction device, bearing means carried by said support, a transversely extending bar supported by said bearing means and upon which said bar is free to rotate about its own axis, and arms extending laterally from and supported by said bar and upon which said upstanding frame is pivotally mounted.

21. In a ground cultivating machine, the combination of a main frame having ground working implements thereon, an upstanding frame upon which the front portion of said main frame is mounted for movement from a lowered operating position to a raised position whereby to elevate the implements, a support arranged for attachment to a traction device, bearing means carried by said support, a transversely extending bar supported by said bearing means and upon which said bar is free to rotate about its own axis, draft arms extending laterally from and supported by said bar and upon which said upstanding frame is pivotally mounted, and draft members extending longitudinally of said main frame and having their rear ends pivotally connected with the latter and their front ends connected with said arms.

22. In a ground cultivating machine, combination of a main frame having ground working implements thereon, an upstanding frame upon which the front portion of said main frame is mounted for movement from a lowered operating position to a raised position whereby to elevate the implements, a support arranged for attachment to a traction device, and connecting means between said support and the upstanding frame comprising a draft element rotatable upon said support about a transverse axis and having draft members extending laterally therefrom and forming supports for said upstanding frame.

23. In a ground cultivating machine, the combination of a main frame having ground working implements thereon, an upstanding frame upon which the front portion of said main frame is mounted for movement from a lowered operating position to a raised position whereby to elevate the implements, a support arranged for attachment to a traction device, connecting means between said support and the upstanding frame comprising a draft element rotatable upon said support about a transverse axis and having parts thereon forming pivotal supports for said upstanding frame, and draft members extending longitudinally of said main frame and having their rear ends connected therewith and their front ends connected with said parts.

24. In a ground cultivating machine, the combination of a main frame having ground working implements thereon, an upstanding frame upon which the front portion of said main frame is mounted for movement from a lowered operating position to a raised position whereby to elevate the implements, a support arranged for attachment to a traction device, spaced brackets upon said support, vertically disposed parts carried by said brackets, concave rollers mounted upon said parts each having a sliding and a rotary movement thereon, a transversely extending draft bar upon which said rollers are seated, and supporting means for said upstanding frame carried by said bar.

25. In a ground cultivating machine, the combination of a main frame having ground working implements thereon, an upstanding frame upon which the front portion of said main frame is mounted for movement from a lowered operating position to a raised position whereby to elevate the implements, a support arranged for attachment to a traction device, spaced brackets upon said support, vertically disposed parts carried by said brackets, concave rollers mounted upon said parts each having a sliding and a rotary movement thereon, a transversely extending draft bar upon which said rollers are seated, and supporting means for said upstanding frame carried by said bar, said bar being shiftable transversely upon said rollers to permit of a transverse movement of said upstanding frame, and means for effecting a transverse movement of said upstanding frame and bar upon said rollers.

26. In a ground cultivating machine, the combination of a main frame having ground working implements thereon, an upstanding frame upon which the front portion of said main frame is mounted for movement from a lowered operating position to a raised position whereby to elevate the implements, a support arranged for attachment to a traction device, spaced brackets upon said support, vertically adjustable parts carried by said brackets, a transversely extending draft member engaging said parts and arranged to be guided in a vertical plane thereby, means carried by said bar arranged to support said upstanding frame, means carried by said support arranged to engage said draft bar adjacent its middle point to form a bearing upon which the bar is arranged for a tilting movement in a vertical plane, and means for tilting said bar and said upstanding frame to effect a corresponding tilting movement of said main frame.

27. In a ground cultivating machine, the combination of a main frame having ground working implements thereon, an upstanding frame upon which the front portion of said main frame is mounted for movement from a lowered operating position to a raised position whereby to elevate the implements, a support arranged for attachment to a traction device, a transversely extending draft bar adjacent the support, a pair of upper and lower rollers carried by the support for engaging opposite sides of the bar to form supporting means therefor permitting the bar to be rocked thereon in a vertical plane, draft means engaging the bar and connected with the support, means connecting said upstanding frame with said bar, and means for effecting a rocking movement of the bar and the upstanding frame upon said rollers to effect corresponding movement of the main frame.

28. In a ground cultivating machine, the combination of a main frame having ground working implements thereon, an upstanding frame upon which the front portion of said main frame is mounted for movement from a lowered operating position to a predetermined raised position whereby to elevate the implements, and draft means comprising relatively movable parts connected with said main frame and arranged for connection with a traction device, certain of said parts being connected with said upstanding frame and forming supporting means therefor.

29. In a ground cultivating machine, the combination of a main frame having ground working implements thereon, an upstanding frame upon which the front portion of said main frame is mounted for movement from a lowered operating position to a predetermined raised position whereby to elevate the implements, draft means comprising relatively movable parts connected with said main frame and arranged for connection with a traction device, certain of said parts being connected with said upstanding frame and forming supporting means therefor, ground engaging means for supporting the rear end of said main frame, and a rotary plow carrying frame upon said main frame arranged to cooperate with the ground during advancement of the machine to elevate said main frame to said predetermined position.

30. In a ground cultivating machine, the combination of a main frame having ground working implements thereon, an upstanding frame upon which the front portion of said main frame is mounted for movement from a lowered operating position to a predetermined raised position whereby to elevate the implements, draft means comprising relatively movable parts connected with said main frame and forming a support for said upstanding frame, supporting means for said parts arranged for connection with a traction device and permitting said parts and said upstanding frame to move transversely thereon, and means interposed between said supporting means and said upstanding frame for moving the latter transversely of the supporting means.

31. In a ground cultivating machine, the combination of a main frame having ground working implements thereon, an upstanding frame upon which the front portion of said main frame is mounted for movement from a lowered operating position to a predetermined raised position whereby to elevate the implements, draft arms pivotally supporting said upstanding frame, draft links having their rear ends connected with the main frame intermediate its ends and extending forwardly and pivotally connected with the draft arms, a transverse draft bar slidably mounted upon said arms, springs upon said arms for yieldingly resisting the forward movement of said draft bar said springs normally urging the draft bar in engagement with the ends of the links, means for limiting the pivotal movement of the links upon said arms when the main frame is raised to said predetermined position whereby said arms will effect rotation of the draft bar about its own axis, and mechanism connected with said bar and adapted for connection with a traction device and including supporting means for the bar upon which it is free to rotate.

32. In a ground cultivating machine, the combination of a main frame having ground working implements thereon, an upstanding frame upon which the front portion of said main frame is mounted for movement from a lowered operating position to a predetermined raised position whereby to elevate the implements, supporting means arranged for connection with a traction device, said upstanding frame being mounted upon said supporting means for a tilting movement in a plane transverse to the direction of movement of the machine, and means for tilting said upstanding frame in said plane.

33. In a ground cultivating machine, the combination of a main frame, an upstanding frame upon which the front portion of said main frame is mounted for movement from a lowered operating position to a predetermined raised position, supporting means arranged for connection with a traction device, said upstanding frame being mounted upon said supporting means for a tilting movement in a plane transverse to the direction of movement of the machine, means for tilting said upstanding frame in said plane, ground engaging supporting means for the rear end of said main frame, and a secondary implement carrying frame rotatable upon said main frame and arranged to operate through contact with the ground during advancement of the machine to raise said main frame to said predetermined position.

34. In a ground cultivating machine, the combination of a main frame having ground working implements thereon, an upstanding frame upon which the front portion of said main frame is mounted for movement from a lowered operating position to a predetermined raised position whereby to elevate the implements, supporting means arranged for connection with a traction device, said upstanding frame being mounted upon said supporting means for movement transversely thereon to effect a corresponding movement of said main frame, and means for moving said upstanding frame transversely upon said supporting means.

35. In a ground cultivating machine, the combination of a main frame, an upstanding frame upon which the front portion of said main frame is mounted for movement from a lowered operating position to a predetermined raised position, supporting means arranged for connection with a traction device, said upstanding frame being mounted upon said supporting means for movement transversely thereon to effect a corresponding movement of said main frame, means for moving said upstanding frame transversely upon said supporting means, ground engaging supporting means for the rear end of said main frame, and a secondary implement carrying frame rotatable upon said main frame and arranged to operate through contact with the ground during advancement of the machine to raise said main frame to said predetermined position.

36. In a ground cultivating machine, the combination of a main frame having ground working implements thereon, an upstanding frame upon which the front portion of the main frame is mounted for movement from a lowered operating position to a predetermined raised position, draft means connected with the main frame intermediate its ends and extending forwardly and connected with said upstanding frame, and means for connecting said draft means with a traction device.

37. In a ground cultivating machine, the combination of a main frame, ground engaging supporting means for the rear end of said main frame, an upstanding frame upon which the front portion of said main frame is mounted for movement from a lowered position to a predetermined raised position, means for connecting said upstanding frame with a traction device, and draft means connected with the main frame intermediate its ends and extending forwardly and connected with said last mentioned means.

38. In a ground cultivating machine, the combination of a main frame, ground engaging supporting means for the rear end of said main frame, an upstanding frame upon which the front portion of said main frame is mounted for movement from a lowered position to a predetermined raised position, means for connecting said upstanding frame with a traction device, draft means connected with the main frame intermediate its ends and extending forwardly and connected with said last mentioned means, a secondary frame rotatably mounted upon said main frame and arranged to operate through contact with the ground during advancement of the machine to raise said main frame to said predetermined position, and ground working implements carried by one of said frames.

39. In a ground cultivating machine, the combination of an implement carrying frame, ground engaging supporting means for the rear end of said frame, and means for connecting the front end of said frame with a traction device said last mentioned means including upstanding guide means upon which said front end is free to travel while connected with said guide means from a lowered operating position to a predetermined raised position above the rear end of said implement carrying frame.

40. In a ground cultivating machine, the combination of an implement carrying frame, ground engaging supporting means for one end of said frame, means for connecting the opposite end of said frame with a traction device including upstanding means upon which said last mentioned frame end is adjustable from a lowered to a predetermined raised position, and draft means connected with said implement carrying frame intermediate its ends and extending to and connected with the means for connecting the implement carrying frame with said traction device.

41. In a ground cultivating machine, the combination of an implement carrying frame, ground engaging supporting means for one end of said frame, means for connecting the opposite end of said frame with a traction device including upstanding means upon which said last mentioned frame end is adjustable from a lowered to a predetermined raised position, draft means connected with said implement carrying frame intermediate its ends and extending to and connected with the means for connecting the implement carrying frame with said traction device, and means arranged to operate through contact with the ground during advancement of the machine to raise said frame to said predetermined position.

42. In a ground cultivating machine, the combination of a frame provided with ground working implements, ground engaging supporting means for the rear portion of said frame, and upstanding means for supporting the front portion of said frame having a vertical guideway receiving a portion of the implement carrying frame and permitting it to move freely thereon from a lowered operating position to a predetermined raised position whereby to elevate the implements.

43. In a ground cultivating machine, the combination of a frame, ground engaging supporting means for one end of said frame, means for supporting the opposite end of said frame for movement from a lowered operating position to a predetermined raised position, and rotary means upon said frame including ground working implements, a portion of said rotary means being arranged to operate through contact with the ground during advancement of the machine to raise said frame to said predetermined position.

44. In a ground cultivating machine, the combination of front and rear wheels, a main frame interposed between said wheels, supporting devices for the front and rear ends of said frame carried by said wheels, said front supporting device including upstanding means upon which the front end of said main frame is arranged to travel from a lowered operating position to a predetermined raised position, a secondary frame rotatably mounted upon said main frame including ground cultivating implements, and holding means for said secondary frame operable to release the same, said secondary frame when released during advancement of the machine operating through contact with the ground to raise the front portion of said main frame to said predetermined position.

45. In a ground cultivating machine, the combination of front and rear wheels, a main frame interposed between said wheels, supporting devices for the front and rear ends of said frame carried by the wheels, said front supporting device comprising relatively movable sections one of which is adjustable transversely upon the other, said transversely adjustable section including upstanding means upon which the front end of said main frame is movable from a lowered to a predetermined raised position, releasable holding means on said upstanding means for supporting said main frame in said raised position, a secondary frame rotatably mounted upon said main frame including ground cultivating implements, and releasable supporting means for said secondary frame, the latter when released during advancement of the machine operating through contact with the ground to raise said main frame into position to be supported by said holding means.

46. In a ground cultivating machine, the combination of front and rear wheels, a pair of relatively movable frames disposed between and supported by said wheels, one comprising a rear implement carrying frame and the other including a front upstanding frame supported by the front wheels and upon which the front portion of the rear frame is arranged for adjustment from a lowered operating position to a predetermined raised position, means for holding the front portion of said implement carrying frame in raised position upon said upstanding frame, and releasable means associated with and movable relative to said implement carrying frame arranged to cooperate with the ground during advancement of the machine whereby to effect movement of the front portion of said implement carrying frame to said raised position.

47. In apparatus of the class described, the combination with a tractor, of a main frame, an upstanding frame connected with and supported by the tractor, the front portion of said main frame being adjustable from a lowered operating to a predetermined raised position upon said upstanding frame, means for supporting the rear portion of said main frame, a secondary frame rotatably mounted upon said main frame including ground cultivating implements, and holding means on the main frame operable to release said secondary frame, the latter when released during advancement of the machine operating through contact with the ground to raise the front portion of said main frame to said predetermined position.

48. In apparatus of the class described, the combination with a tractor, of a main frame, draft means connecting said main frame with the tractor, upstanding means carried by said draft means and upon which the front portion of said main frame is adjustable from a lowered to a predetermined raised position, wheel means for supporting the rear portion of said main frame, a secondary frame rotatably mounted upon said main frame including ground cultivating implements, and holding means on the main frame operable to release said secondary frame, the latter when released during advancement of the machine operating through contact with the ground to raise the front portion of said main frame to said predetermined position.

49. In apparatus of the class described, the combination with a tractor, of an upstanding frame connected with and supported by the tractor, a main frame connected with said upstanding frame and arranged to move thereon from a lowered operating position to a predetermined raised position, a ground engaging support for the rear end of said main frame, a secondary frame rotatably mounted upon said main frame and including right and left hand plows, holding means for the secondary frame, the latter when released during advancement of the machine operating through contact with the ground to raise said main frame to said predetermined position, and means for holding said main frame in said raised position.

50. In apparatus of the class described, the combination with a tractor, of supporting means carried by the tractor, an upstanding frame mounted for a tilting and a transverse movement upon said supporting means, a main frame connected with said upstanding frame to be tilted and moved transversely thereby, devices for effecting said tilting and transverse movements, said main frame being arranged to move upon said upstanding frame from a lowered operating position to a predetermined raised position, a ground engaging support for the rear end of said main frame, a secondary frame rotatably mounted upon said main frame and including right and left hand plows, holding means for the secondary frame, the latter when released during advancement of the machine operating through contact with the ground to raise said main frame to said predetermined position, and means for holding said main frame in said raised position.

51. In a ground cultivating machine, the combination of an upstanding guide frame and a rear angularly disposed frame, one of said frames being arranged for connection with a source of draft power for advancing the machine, said rear frame being guided by said upstanding frame when moved from a lowered operating position to a raised non-operating position, means for supporting the rear frame in raised position upon the guide frame, ground engaging means for supporting said rear frame in elevated non-operating position independently of its support by said guide frame, oppositely disposed ground cultivating implements mounted upon said rear frame for rotation to different positions of adjustment by contact with the ground during advancement of the machine to position said implements for operation when said rear frame is lowered to operating position, said implements operating when rotating in contact with the ground to raise said rear frame to non-operating position, and releasable means for holding the implements against rotation upon the rear frame.

52. In a ground cultivating machine, the combination of an upstanding guide frame and a rear angularly disposed frame, one of said frames being arranged for connection with a source of draft power for advancing the machine, said rear frame being guided by said upstanding frame when moved from a lowered operating position to a raised non-operating position, automatic holding means upon the guide frame arranged to engage and support the rear frame when moved to said raised position, oppositely disposed ground cultivating implements connected to form a unitary structure mounted upon said rear frame for rotation progressively in the same direction to different positions of adjustment by contact with the ground during advancement of the machine to successively position said implements for operation when said rear frame is lowered to operating position, said unitary structure operating when contacting with the ground during rotation to raise said rear frame to non-operating position, and means for holding said unitary structure against rotation upon the rear frame.

53. In a ground cultivating machine, the combination of an upstanding guide frame and a rear angularly disposed frame connected therewith and arranged to be guided thereby when moving between a lowered operating position and a raised non-operating position, automatic holding means for said rear frame arranged to support the latter when it is moved to said raised position, draft means connecting said upstanding frame and said rear frame extending beneath the latter and permitting said frames to move one relative to another, a rotary frame upon said rear frame including oppositely positioned ground cultivating implements, said rotary frame being arranged for rotation by contact with the ground during advancement of the machine to raise said rear frame and to progressively position the implements for subsequent operation when said rear frame is lowered from said raised non-operating position, and means for holding the rotary frame in its different positions upon said rear frame.

54. In a ground cultivating machine, the combination of an upstanding guide frame and a rear angularly disposed frame connected therewith and arranged to be guided thereby when moving between a lowered operating position and a raised non-operating position, automatic holding means for said rear frame arranged to move into supporting engagement with the rear frame when the latter is moved to said raised position, one or more draft links connected with said rear frame beneath the latter, said links and upstanding frame being arranged for connection with a source of draft power, a rotary frame upon said rear frame including oppositely positioned ground cultivating implements, said rotary frame being arranged for rotation by contact with the ground during advancement of the machine to elevate said rear frame and to progressively position the implements for operation when said rear frame is lowered from said raised non-operating position, and means for holding the rotary frame in its different positions upon said rear frame.

55. In a ground cultivating machine, the combination of an upstanding guide frame and a rear angularly disposed frame, one of said frames being arranged for connection with a source of draft power for advancing the machine, said rear frame being guided by said upstanding frame when moved from a lowered operating position to a raised non-operating position, means for supporting the rear frame in said raised position upon the guide frame, ground engaging means for supporting said rear frame in said raised position independently of the last mentioned supporting means, oppositely disposed ground cultivating implements mounted for rotation upon said rear frame, and means associated with the implements arranged to be actuated by the travel of the machine to elevate said rear frame upon said guide frame and to position the implements by rotation thereof for operation when the rear frame is in lowered position.

56. In a ground cultivating machine, the combination of an upstanding guide frame and a rear angularly disposed frame, one of said frames being arranged for connection with a source of draft power for advancing the machine, said rear frame being guided by said upstanding frame when moved from a lowered operating position to a raised non-operating position, means for supporting the rear frame in said raised position upon the guide frame, ground engaging means for supporting said rear frame in said raised position independently of its support by said guide frame, right and left hand plows mounted for rotation upon said rear frame about a transverse axis progressively in the same direction for successive operation when the rear frame is in lowered position, and means associated with the plows arranged to be actuated by the travel of the machine to elevate said rear frame upon said guide frame and to progressively position the implements for operation when the rear frame is in lowered position.

57. In a ground cultivating machine, the combination of an upstanding guide frame and a rear angularly disposed implement carrying frame, one of said frames being arranged for connection with a source of draft power for advancing the machine, said rear frame being guided by said upstanding frame when moved from a lowered operating position to a raised non-operating position, automatic means operating to support the rear frame upon the guide frame when the rear frame is elevated to non-operating position, ground engaging means for supporting said rear frame in raised position independently of its support by said guide frame, a frame including right and left hand plows mounted for rotation upon said rear frame through contact with the ground during advancement of the machine to both elevate the rear frame upon the guide frame and to progressively position said plows for subsequent operation when the rear frame is lowered to operating position, and releasable means for holding said rotary frame in its different positions upon the rear frame.

HENRY J. NEUFANG.